US008264995B2

(12) United States Patent
Winterton

(10) Patent No.: US 8,264,995 B2
(45) Date of Patent: Sep. 11, 2012

(54) APPARATUS AND METHOD FOR ADJUSTING A DUTY CYCLE TO SAVE POWER IN A COMPUTING SYSTEM

(75) Inventor: Richard R. Winterton, Provo, UT (US)

(73) Assignee: Intel Corporation, Santa Clara, CA (US)

(*) Notice: Subject to any disclaimer, the term of this patent is extended or adjusted under 35 U.S.C. 154(b) by 178 days.

(21) Appl. No.: 12/655,430

(22) Filed: Dec. 29, 2009

(65) Prior Publication Data
US 2010/0115069 A1 May 6, 2010

Related U.S. Application Data

(63) Continuation of application No. 11/022,213, filed on Dec. 23, 2004, now Pat. No. 7,787,403.

(51) Int. Cl.
G08C 17/00 (2006.01)

(52) U.S. Cl. ......... 370/311; 370/503; 455/522; 713/300

(58) Field of Classification Search ............... 370/311, 370/318, 229, 231, 463, 419, 401, 465, 459, 370/458, 450, 394, 420, 522; 713/300, 320, 713/323, 324, 330, 340; 455/522
See application file for complete search history.

(56) References Cited

U.S. PATENT DOCUMENTS

| | | | |
|---|---|---|---|
| 5,861,822 A | 1/1999 | Park et al. | |
| 5,884,187 A | 3/1999 | Ziv et al. | |
| 6,480,476 B1 | 11/2002 | Willars | |
| 6,571,089 B1 | 5/2003 | Richards et al. | |
| 6,606,482 B1 | 8/2003 | Wheeler | |
| 6,795,450 B1 | 9/2004 | Mills et al. | |
| 7,317,691 B2 | 1/2008 | Mills et al. | |
| 2002/0142791 A1* | 10/2002 | Chen et al. | 455/522 |
| 2003/0022686 A1 | 1/2003 | Soomro et al. | |
| 2003/0091017 A1 | 5/2003 | Davenport et al. | |
| 2003/0161348 A1* | 8/2003 | Mills et al. | 370/509 |
| 2003/0194979 A1 | 10/2003 | Richards et al. | |
| 2004/0125779 A1* | 7/2004 | Kelton et al. | 370/338 |
| 2004/0190507 A1 | 9/2004 | Wu et al. | |

FOREIGN PATENT DOCUMENTS

EP 1237328 A2 9/2002

(Continued)

OTHER PUBLICATIONS

Yuen et al., "Adaptive Buffer Sensitive Scheduling for Transmitting Video Streams in a Mobile Multimedia System," Real-time Technology and Applications Symposium, 2001, Proceedings, Seventh IEEE Taipei, Taiwan, May 30, 2001, pp. 125-126. XP010550103.

(Continued)

Primary Examiner — Kibrom T Hailu
Assistant Examiner — Dady Chery
(74) Attorney, Agent, or Firm — Barre Law Firm, PLLC

(57) ABSTRACT

A method and system for adjusting a duty cycle to save power in a computing system is described. The system includes a network interface card (NIC) that has an active mode and a sleep mode. The NIC is coupled to an adjusting element that adjusts a duty cycle of the active time to the sleep time based at least in part on minimizing power consumption.

27 Claims, 3 Drawing Sheets

FOREIGN PATENT DOCUMENTS

| | | |
|---|---|---|
| EP | 1357704 A2 | 10/2003 |
| JP | 11-205216 A | 7/1999 |
| JP | 11-331234 A | 11/1999 |
| JP | 2000-253056 A | 9/2000 |
| JP | 2004-513451 A | 4/2004 |
| JP | 2004-252928 A | 9/2004 |
| JP | 2006-529069 A | 12/2006 |
| KR | 10-2003-85082 A | 11/2003 |
| KR | 10-2004-0020638 A | 3/2004 |
| WO | 00/22837 A2 | 4/2000 |
| WO | 01/99384 A2 | 12/2001 |
| WO | 02/25826 A2 | 3/2002 |
| WO | 02/47321 A2 | 6/2002 |
| WO | 03/003657 A1 | 1/2003 |
| WO | 2004/019521 A1 | 3/2004 |
| WO | 2004/105417 A1 | 12/2004 |
| WO | 2006/071821 A2 | 7/2006 |
| WO | 2006/071821 A3 | 1/2007 |

OTHER PUBLICATIONS

International Search Report and Written Opinion received for PCT Application No. PCT/US2005/046945, mailed on Jun. 20, 2006, 17 pages.

International Preliminary Report on Patentability received for PCT Application No. PCT/US2005/046945, mailed on Jul. 5, 2007, 10 pages.

Office Action received for Korean Patent Application No. 10-2007-7014194, mailed on Sep. 26, 2008, 8 pages.

Office Action received for Chinese Patent Application No. 200580044325.9, mailed on May 22, 2009, 15 pages.

Office Action received for Japanese Patent Application No. 2007-548564, mailed on Jul. 13, 2010, 3 pages of English Translation.

Office Action received for German Patent Application No. 112005003264.7 mailed, on Jul. 4, 2011, 6 pages of English translation and 6 pages of Office Action.

Office Action received for Chinese Patent Application No. 200580044325.9, mailed on Jan. 15, 2010, 3 pages of English translation and 4 pages of office action.

Examination Report received for United Kingdom Patent Application No. 0713985.0, mailed on Oct. 27, 2008, 3 pages.

Decision of Grant mailed May 15, 2012 for Japanese Patent Application No. 20100230815; 1 page.

\* cited by examiner

APPARATUS AND METHOD FOR ADJUSTING A DUTY CYCLE TO SAVE POWER IN A COMPUTING SYSTEM

CROSS REFERENCE TO RELATED APPLICATIONS

The present application is a continuation of U.S. patent application Ser. No. 11/022,213, entitled "Method and Apparatus for Adjusting a Duty Cycle to Save Power in a Computing System" filed on Dec. 23, 2004.

BACKGROUND OF THE DISCLOSURE

1. Technical Field

Embodiments of the invention relate to saving power in a computing system, and more specifically to adjusting a duty cycle of a network interface card to save power in a computing system.

2. Background

The use of mobile or wireless devices has been increasing. However, using mobile devices to receive streaming data or large file transfers over a network consumes significant amounts of power. To save power, the network interface card (NIC) may be put into a low power state, such as a sleep mode, until it receives a request to wake up to receive or transmit data. For example, the NIC may wake up when it receives a request from an access point to receive data. The NIC may then receive data that has been buffered by the access point for the wireless device. One problem with this technique is that some applications, such as streaming applications, require time critical data. If the streaming application runs out of data, the stream is interrupted, and the user will not have a good experience. However, if the user can only use the device for a short period of time while receiving streaming data, then use of the device is also not desired.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Embodiments of a system and method for adjusting a duty cycle to save power in a computing system are described. In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
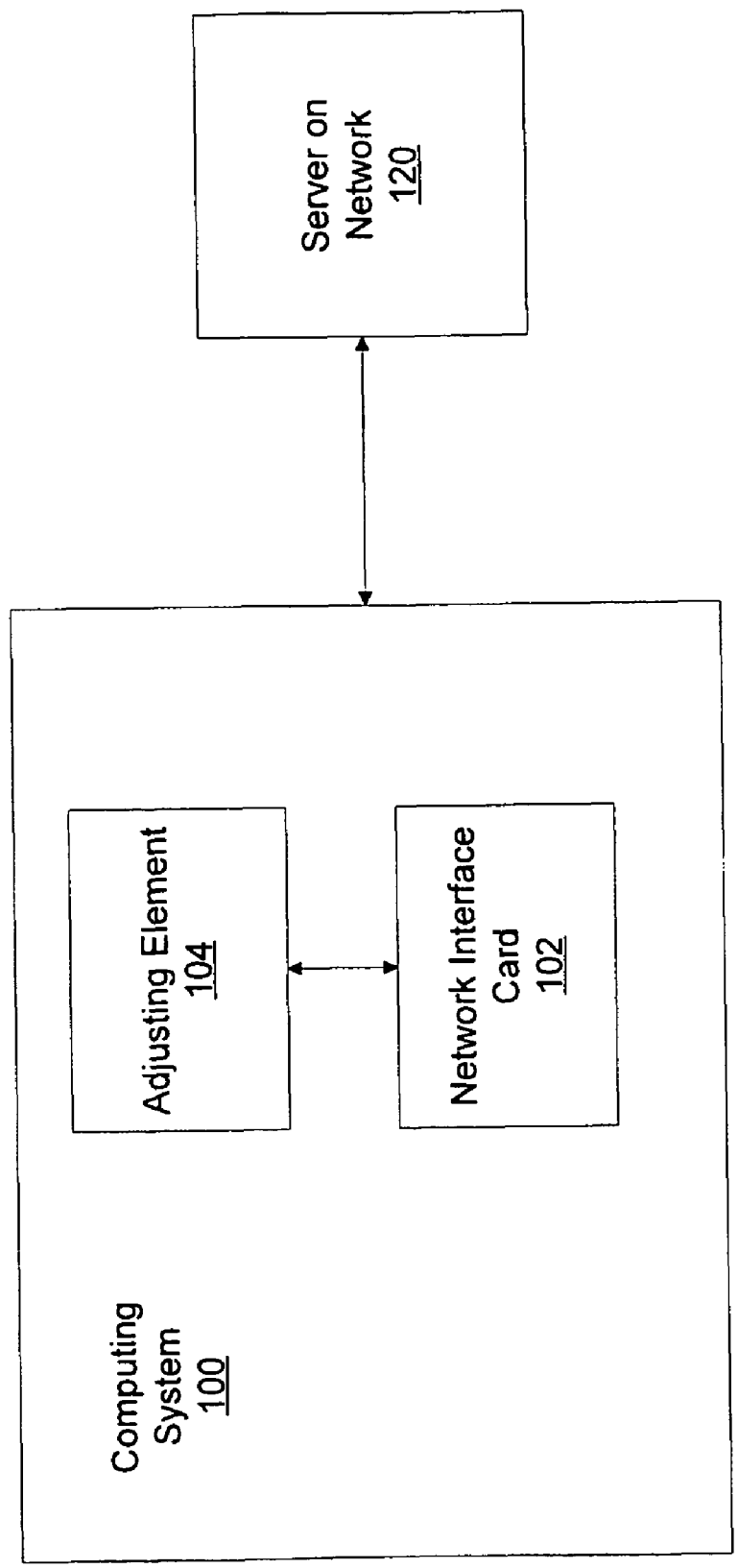
FIG. 1 is a block diagram illustrating a system according to one embodiment of the invention.

Referring to FIG. 1, a block diagram illustrates a system 100 according to one embodiment of the invention. Those of ordinary skill in the art will appreciate that the system 100 may include more components than those shown in FIG. 1. However, it is not necessary that all of these generally conventional components be shown in order to disclose an illustrative embodiment for practicing the invention. In one embodiment, the system 100 is a wireless computing system, such as a laptop.

System 100 includes a network interface card (NIC) 102 and an adjusting element 104 to adjust a duty cycle of the NIC 102. The NIC 102 communicatively couples the system 100 to a network. The NIC 102 includes an active mode and a sleep mode. In one embodiment, the NIC 102 includes an active mode and a sleep mode according to the IEEE (Institute of Electrical and Electronics Engineers) 802.11 specification. In the sleep mode, the NIC is in a low power state. The NIC wakes up and goes into the active mode when it receives a request to receive or transmit data. The duty cycle of the active time compared to the sleep time of the NIC determines the amount of power savings for system 100. The duty cycle may be adjusted to minimize power consumption and maximize the amount of power savings.

The adjusting element 104 may be a device or an application running on system 100. The adjusting element 104 checks to see if system 100 is primarily connected to a wireless network. If so, the adjusting element 104 may adjust the duty cycle of the active time of the NIC 102 to minimize power consumption. The adjusting element 104 may adjust the data rate of data transfers to system 100 to make the data traffic as bursty as possible. For example, the adjusting element may request from a server on the network 120 a large amount of data in a stream for a streaming application. The request for data is sent along with any necessary streaming requirements, such as the data rate. The data received in response to this request may then be buffered, and the NIC 102 may go into sleep mode for a period of time while the data is being consumed. Then, a request for more data would be sent to the server on the network. The streaming server would stream more data to system 100 and the NIC 102 would wake up to receive this data. The data is buffered and the NIC 102 may go into sleep mode again until most of the data is consumed. More data is then requested, the NIC goes back into active mode, and the process is repeated. This process may be used with various types of messages and transmissions, including but not limited to Transmission Control Protocol (TCP) transmissions and User Datagram Protocol (UDP) messages. Broadcast and multicast messages may also be buffered and transmitted using this process. Large file transfers, such as JPEG, Word, or Powerpoint files, may be transferred using this process. By using this process, the data traffic is as bursty as possible and power consumption is minimized.

Figure 2:
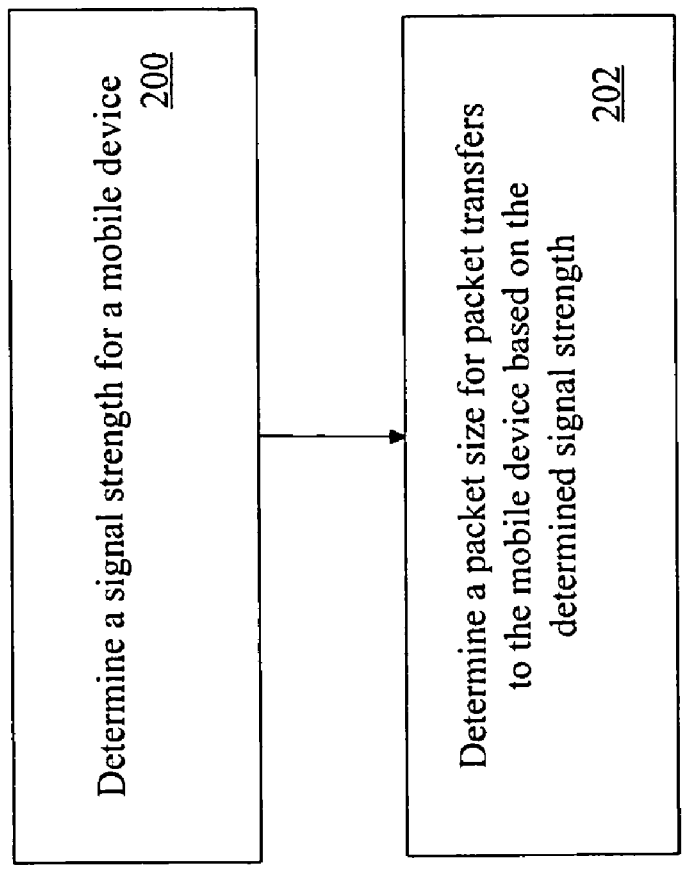
FIG. 2 is a flow diagram illustrating a method according to an embodiment of the invention.

FIG. 2 illustrates a method according to one embodiment of the invention. An adjusting element, such as an application, may determine whether a computing device is communicatively coupled to a wireless network. If so, at 200, the signal strength of the computing device is determined. When the distance between a mobile computing device and an access point increases, the signal strength generally decreases, which may cause more errors in data transfers. As signal strength decreases, a smaller packet size for data transfers may be desired. Therefore, at 202, the packet size of data transfers is determined based at least in part on the determined signal strength. In one embodiment, a lookup table is checked to determined which packet size is a best match for the determined signal strength. The lookup tables may vary depending on the type or manufacturer of the NIC.

In one embodiment, the type of content to be received by the computing device is determined. For example, different types of content, such as audio or video, may be consumed at a different rate. After the type of content is determined, if the type of content is for consumption, the rate of consumption is determined. A duty cycle of the device may then be adjusted based on the packet size and consumption rate. In one embodiment, the duty cycle may be adjusted to make data traffic as bursty as possible given the determined packet size and expected consumption rate. In one embodiment, the data rate of data transfers may be adjusted to make the data traffic as bursty as possible, and power savings for the mobile device may be maximized as a result. In this way, the battery life and time of use of the mobile device is maximized while data is streamed at an appropriate rate to provide the user with a continuous stream of data for time critical applications.

Figure 3:
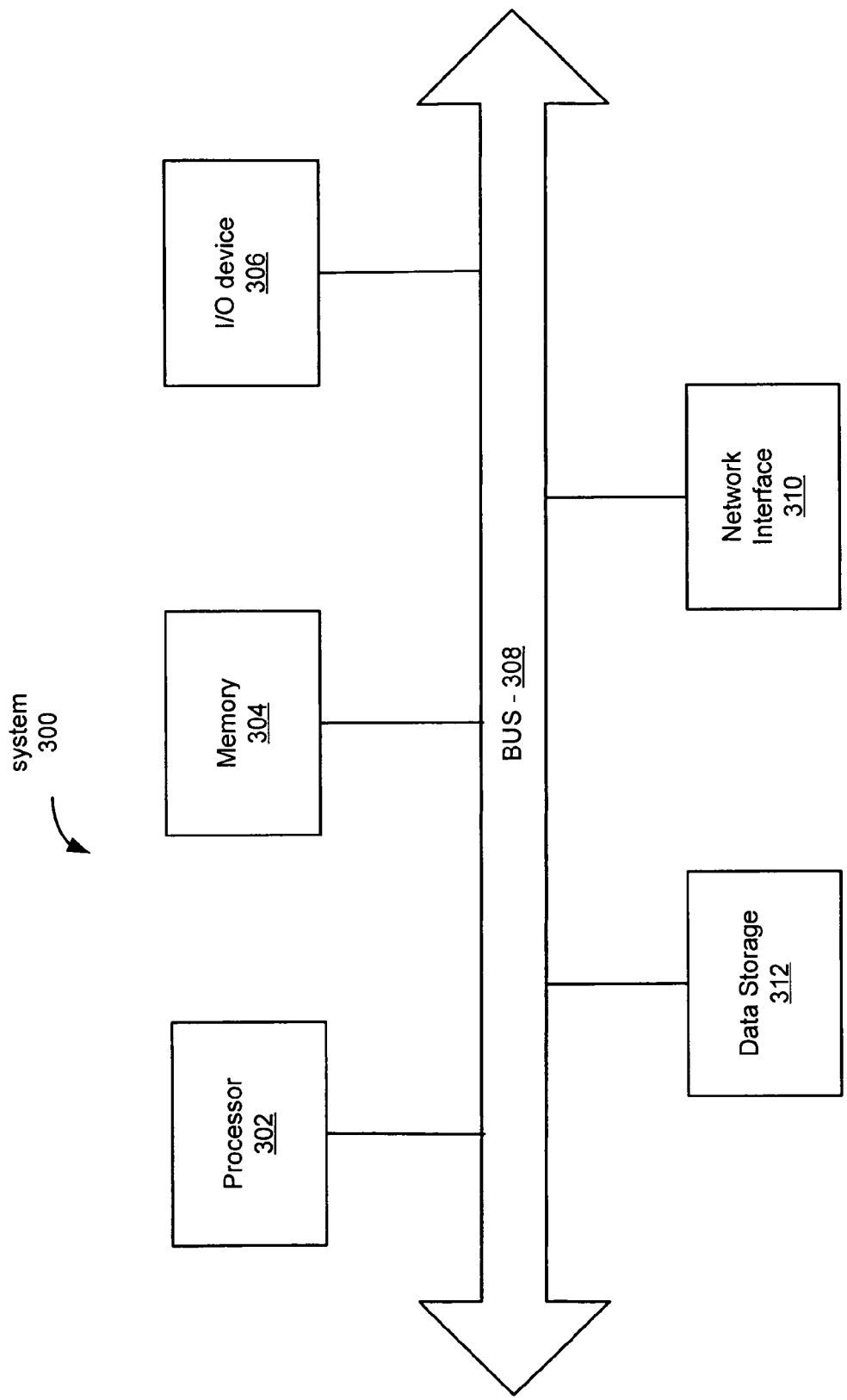
FIG. 3 is a block diagram illustrating a suitable computing environment in which certain aspects of the illustrated invention may be practiced.

FIG. 3 is a block diagram illustrating a suitable computing environment in which certain aspects of the illustrated invention may be practiced. In one embodiment, the method described above may be implemented on a computer system 300 having components 302-312, including a processor 302, a memory 304, an Input/Output device 306, a data storage device 312, and a network interface 310, coupled to each other via a bus 308. The components perform their conventional functions known in the art and provide the means for implementing the system 100. Collectively, these components represent a broad category of hardware systems, including but not limited to general purpose computer systems, mobile or wireless systems, and specialized packet forwarding devices. It is to be appreciated that various components of computer system 300 may be rearranged, and that certain implementations of the present invention may not require nor include all of the above components. Furthermore, additional components may be included in system 300, such as additional processors (e.g., a digital signal processor), storage devices, memories (e.g. flash memory), and network or communication interfaces.

As will be appreciated by those skilled in the art, the content for implementing an embodiment of the method of the invention, for example, computer program instructions, may be provided by any machine-readable media which can store data that is accessible by system 100, as part of or in addition to memory, including but not limited to cartridges, magnetic cassettes, flash memory cards, digital video disks, random access memories (RAMs), read-only memories (ROMs), and the like. In this regard, the system 100 is equipped to communicate with such machine-readable media in a manner well-known in the art.

It will be further appreciated by those skilled in the art that the content for implementing an embodiment of the method of the invention may be provided to the system 100 from any external device capable of storing the content and communicating the content to the system 100. For example, in one embodiment of the invention, the system 100 may be connected to a network, and the content may be stored on any device in the network.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   receiving data on a computing device, the received data for consumption by an entity communicatively coupled to the computing device, the computing device having an active mode in which data are received and a sleep mode in which data are not received, wherein a duty cycle of the computing device is determined by a first time in which the computing device is in the active mode and a second time in which the computing device is in the sleep mode;
   adaptively adjusting the duty cycle of the computing device, based at least in part on a rate at which the received data is utilized by the entity;
   determining a signal strength for the computing device; and
   determining a packet size for packet transfers to the computing device, based at least in part on the determined signal strength;
   wherein adaptively adjusting the duty cycle of the computing device comprises adaptively adjusting the duty cycle of the computing device, based at least in part on the packet size; and
   wherein determining the packet size for packet transfers to the computing device, based at least in part on the determined signal strength comprises checking a lookup table to determine which packet size is a best match for the determined signal strength.

2. The method of claim 1 wherein
   adaptively adjusting the duty cycle of the computing device comprises adaptively adjusting the duty cycle of the computing device to minimize power consumption.

3. The method of claim 1 wherein
   adaptively adjusting the duty cycle of the computing device comprises adaptively adjusting the duty cycle of the computing device, based at least in part on a type of content to be received by the computing device.

4. The method of claim 1 wherein
   the active mode and the sleep mode operate in accordance with the IEEE (Institute of Electrical and Electronics Engineers) 802.11 specification.

5. The method of claim 1 further comprising:
   determining whether the computing device is communicatively coupled to a wireless network, wherein adaptively adjusting the duty cycle of the computing device comprises adaptively adjusting the duty cycle of the computing device based at least in part on whether the computing device is communicatively coupled to a wireless network.

6. A computing device comprising:
   a memory;
   a network interface card (NIC) coupled to the memory, the NIC to receive data on the computing device, the received data for consumption by an entity communicatively coupled to the computing device, the computing device having an active mode in which data are received and a sleep mode in which data are not received, wherein a duty cycle of the computing device is determined by a first time in which the computing device is in the active mode and a second time in which the computing device is in the sleep mode; and an adjusting element coupled to the NIC to adaptively adjust the duty cycle of the computing device, based at least in part on a rate at which the received data is utilized by the entity;

wherein the adjusting element is configured to determine a signal strength for the computing device;

wherein the adjusting element is configured to determine a packet size for packet transfers to the computing device, based at least in part on the determined signal strength;

wherein adaptively adjusting the duty cycle of the computing device comprises adaptively adjusting the duty cycle of the computing device, based at least in part on the packet size; and wherein determining the packet size for packet transfers to the computing device, based at least in part on the determined signal strength comprises checking a lookup table to determine which packet size is a best match for the determined signal strength.

7. The computing device of claim 6 wherein adaptively adjusting the duty cycle of the computing device comprises adaptively adjusting the duty cycle of the computing device to minimize power consumption.

8. The computing device of claim 6 wherein adaptively adjusting the duty cycle of the computing device comprises adaptively adjusting the duty cycle of the computing device, based at least in part on a type of content to be received by the computing device.

9. The computing device of claim 6 wherein the active mode and the sleep mode operate in accordance with the IEEE (Institute of Electrical and Electronics Engineers) 802.11 specification.

10. The computing device of claim 6 wherein the adjusting element further performs operations comprising:
   determining whether the computing device is communicatively coupled to a wireless network, wherein adaptively adjusting the duty cycle of the computing device comprises adaptively adjusting the duty cycle of the computing device based at least in part on whether the computing device is communicatively coupled to a wireless network.

11. A computer program product comprising:
a non-transitory computer readable storage medium;
instructions in the computer-readable storage medium, wherein the instructions, when executed by a processor in a computing device, cause the computing device to:
receive data on the computing device, the received data for consumption by an entity communicatively coupled to the computing device, the computing device having an active mode in which data are received and a sleep mode in which data are not received, wherein a duty cycle of the computing device is determined by a first time in which the computing device is in the active mode and a second time in which the computing device is in the sleep mode;
adaptively adjust the duty cycle of the computing device, based at least in part on a rate at which the received data is utilized by the entity;
determine a signal strength for the computing device; and
determine a packet size for packet transfers to the computing device, based at least in part on the determined signal strength;
wherein adaptively adjusting the duty cycle of the computing device comprises adaptively adjusting the duty cycle of the computing device, based at least in part on the packet size; and
wherein determining the packet size for packet transfers to the computing device, based at least in part on the determined signal strength comprises checking a lookup table to determine which packet size is a best match for the determined signal strength.

12. The computer program product of claim 11 wherein adaptively adjusting the duty cycle of the computing device comprises adaptively adjusting the duty cycle of the computing device to minimize power consumption.

13. The computer program product of claim 11 wherein adaptively adjusting the duty cycle of the computing device comprises adaptively adjusting the duty cycle of the computing device, based at least in part on a type of content to be received by the computing device.

14. The computer program product of claim 11 wherein the active mode and the sleep mode operate in accordance with the IEEE (Institute of Electrical and Electronics Engineers) 802.11 specification.

15. The computer program product of claim 11 wherein the instructions further cause the computing device to:
   determine whether the computing device is communicatively coupled to a wireless network, wherein adaptively adjusting the duty cycle of the computing device comprises adaptively adjusting the duty cycle of the computing device based at least in part on whether the computing device is communicatively coupled to a wireless network.

16. A method comprising:
receiving, at a computing device, data from an entity communicatively coupled to the computing device, the computing device having an active mode in which data are received and a sleep mode in which data are not received, wherein a duty cycle of the computing device is determined by a first time in which the computing device is in the active mode and a second time in which the computing device is in the sleep mode;
determining a signal strength for the computing device;
determining a packet size for packet transfers to the computing device, based at least in part on the determined signal strength;
determining whether the computing device is communicatively coupled to a wireless network; and
in response to a determination that the computing device is communicatively coupled to the wireless network, adaptively adjusting the duty cycle of the computing device, based at least in part on a rate at which the received data is utilized.

17. The method of claim 16, wherein the operation of adaptively adjusting the duty cycle of the computing device comprises:
   adaptively adjusting the duty cycle of the computing device to minimize power consumption.

18. The method of claim 16, wherein the operation of adaptively adjusting the duty cycle of the computing device comprises:
   adaptively adjusting the duty cycle of the computing device, based at least in part on a type of content to be received by the computing device.

19. The method of claim 16, wherein the active mode and the sleep mode operate in accordance with the Institute of Electrical and Electronics Engineers (IEEE) 802.11 specification.

20. A computer program product comprising:
a non-transitory computer readable storage medium; and
instructions in the computer-readable storage medium, wherein the instructions, when executed by a processor in a computing device, enable the computing device to:
receive data from an entity communicatively coupled to the computing device, the computing device having an active mode in which data are received and a sleep mode in which data are not received, wherein a duty cycle of the computing device is determined by a first time in which the computing device is in the active mode and a second time in which the computing device is in the sleep mode;

determine a signal strength for the computing device;

determine a packet size for packet transfers to the computing device, based at least in part on the determined signal strength;

determine whether the computing device is communicatively coupled to a wireless network; and in response to a determination that the computing device is communicatively coupled to the wireless network, adaptively adjust the duty cycle of the computing device based at least in part on a rate at which the received data is utilized.

21. The computer program product of claim 20, wherein the operation of adaptively adjusting the duty cycle of the computing device comprises:

adaptively adjusting the duty cycle of the computing device to minimize power consumption.

22. The computer program product of claim 20, wherein the operation of adaptively adjusting the duty cycle of the computing device comprises:

adaptively adjusting the duty cycle of the computing device based at least in part on a type of content to be received by the computing device.

23. The computer program product of claim 20 wherein the active mode and the sleep mode operate in accordance with the IEEE (Institute of Electrical and Electronics Engineers) 802.11 specification.

24. A computing device comprising:

a processor;

a non-transitory computer readable storage medium responsive to the processor; and instructions in the computer-readable storage medium, wherein the instructions, when executed by the processor, enable the computing device to:

receive data from an entity communicatively coupled to the computing device, the computing device having an active mode in which data are received and a sleep mode in which data are not received, wherein a duty cycle of the computing device is determined by a first time in which the computing device is in the active mode and a second time in which the computing device is in the sleep mode;

determine a signal strength for the computing device;

determine a packet size for packet transfers to the computing device, based at least in part on the determined signal strength;

determine whether the computing device is communicatively coupled to a wireless network; and in response to a determination that the computing device is communicatively coupled to the wireless network, adaptively adjust the duty cycle of the computing device based at least in part on a rate at which the received data is utilized.

25. The computing device of claim 24, wherein the operation of adaptively adjusting the duty cycle of the computing device comprises:

adaptively adjusting the duty cycle of the computing device to minimize power consumption.

26. The computing device of claim 24, wherein the operation of adaptively adjusting the duty cycle of the computing device comprises:

adaptively adjusting the duty cycle of the computing device based at least in part on a type of content to be received by the computing device.

27. The computing device of claim 24 wherein the active mode and the sleep mode operate in accordance with the IEEE (Institute of Electrical and Electronics Engineers) 802.11 specification.

* * * * *